US 6,450,675 B1

(12) United States Patent
Nishimoto et al.

(10) Patent No.: US 6,450,675 B1
(45) Date of Patent: Sep. 17, 2002

(54) VEHICLE LAMP COMPOSITION AND METHOD OF MANUFACTURING

(75) Inventors: Kenji Nishimoto, Hyogo; Yoshihiko Hashimoto, Osaka, both of (JP)

(73) Assignee: Kaneka Corp., Osaka (JP)

( * ) Notice: Subject to any disclaimer, the term of this patent is extended or adjusted under 35 U.S.C. 154(b) by 0 days.

(21) Appl. No.: 09/488,013

(22) Filed: Jan. 20, 2000

(30) Foreign Application Priority Data

Jan. 21, 1999 (JP) .......................................... 11-012682

(51) Int. Cl.$^7$ ................................................ F21Y 17/00
(52) U.S. Cl. ...................... 362/546; 428/424.4; 428/347
(58) Field of Search .................... 362/459, 487, 362/505, 507, 546; 428/424.4, 411.1, 402.24, 346, 319.9, 347; 523/201; 524/504, 549, 511; 525/509, 510; 445/22, 66

(56) References Cited

FOREIGN PATENT DOCUMENTS

| JP | 9-12902 | | 1/1997 |
|---|---|---|---|
| JP | 02000276909 A | * | 10/2000 |
| JP | 02001002881 A | * | 1/2001 |

* cited by examiner

Primary Examiner—Sandra O'Shea
Assistant Examiner—Ismael Negron
(74) Attorney, Agent, or Firm—Armstrong, Westerman & Hattori, LLP

(57) ABSTRACT

A vehicular lamp and method for manufacturing including the steps of: providing a lamp body that has been formed from a resin composition obtained by incorporating 0.1 to 5 parts by weight of an antistatic agent in 100 parts by weight of a rubber-reinforced styrene resin; pressing a heated hot plate against the lamp body, thereby melting a portion of the lamp body; and adhering the melted portion of the lamp body to a lamp lens under pressure, thereby bonding the lamp body to the lamp lens.

19 Claims, 1 Drawing Sheet

VEHICLE LAMP COMPOSITION AND METHOD OF MANUFACTURING

FIELD OF THE INVENTION

This invention relates to a vehicular lamp such as head lamp, winker or stop lamp available by bonding a lamp body made of a rubber-reinforced styrene resin to a lamp lens made of a methyl methacrylate resin or the like by the hot plate welding method; a lamp body used for the vehicular lamp; and a method for manufacturing the vehicular lamp.

BACKGROUND OF THE INVENTION

As a method for bonding a lamp lens to a lamp body made of a synthetic resin, it is possible to seal them by an adhesive. A so-called hot plate welding method comprising pressing a hot plate against a lamp body made of an ordinarily employed thermoplastic resin such as an ABS resin, thereby melting a portion of the lamp body and then adhering the melted portion to a lamp lens made of a methyl methacrylate resin or the like under pressure, however, has come to be adopted from the viewpoint of environmental protection, because the hot plate welding method is, different from the sealing by an adhesive, free from the use of a solvent. In such a hot plate welding method, however, when the above-mentioned thermoplastic resin constituting a lamp body made of an ABS resin is melted by a hot plate and then the hot plate is separated from the melted resin, the melted resin is sometimes drawn out in the form of a string (which will hereinafter be called "stringiness") and sticks to the surface of the molded or formed product such as lamp lens or lamp body, leading to inconvenience causing inferior appearance. For reducing the stringiness occurring in the hot plate welding method, for example, a method of adding a fluorine resin such as polytetrafluoroethylene to a thermoplastic resin constituting a lamp body such as polycarbonate or ABS resin is proposed in JP-A-9-12902 (the term "JP-A" as used herein means an "unexamined published Japanese patent application). This hot plate welding method does not completely dissolve the problem of stringiness when effected under low-humidity circumstances such as those in winter.

SUMMARY OF THE INVENTION

An object of the present invention is therefore to alleviate, upon manufacturing a vehicular lamp by bonding a lamp body to a lamp lens by the hot plate welding method, the above-mentioned problem stringiness of the resin constituting the lamp body without being influenced by a change in the season or humidity.

As a result of extensive investigation to attain the above-mentioned object, it has been found that stringiness which occurs upon manufacturing a vehicular lamp by bonding a lamp body to a lamp lens by the hot plate welding method can be reduced largely even under low-humidity conditions such as in winter by molding or forming the lamp body from a resin composition obtained by adding an antistatic agent to a rubber-reinforced styrene resin and by using, as the rubber-reinforced styrene resin, a resin composition available by mixing a graft copolymer containing a specific component with a vinyl copolymer, thereby leading to the completion of the present invention.

In the present invention, there is thus provided a method for manufacturing a vehicular lamp which comprises pressing a heated hot plate against a lamp body made of a rubber-reinforced styrene resin, thereby melting a portion of the lamp body and then adhering the melted portion to a lamp lens under pressure, thereby bonding the lamp body to the lamp lens, wherein the lamp body is molded or formed from a resin composition obtained by adding 0.1 to 5 parts by weight of an antistatic agent to 100 parts by weight of a rubber-reinforced styrene resin and in particular, a resin composition (C) composed mainly of 100 to 10 parts by weight of the following graft copolymer (A) and 0 to 90 parts by weight of the following vinyl copolymer (B), 100 parts by weight in total, is used as the rubber-reinforced styrene resin:

(A) a graft copolymer obtained by graft polymerization of 80 to 5 parts by weight of a monomer mixture to 20 to 95 parts by weight of a rubbery polymer, said monomer mixture containing 99.9 to 60 wt. % of at least one vinyl compound selected from the group consisting of vinyl cyanide compounds, aromatic vinyl compounds and alkyl (meth)acrylate compounds, 0 to 30 wt. % of another vinyl compound copolymerizable therewith and 0.1 to 40 wt. % of a glycidyl ester compound of an $\alpha,\beta$-unsaturated acid; and (B) a vinyl copolymer obtained by the reaction of 10 to 40 wt. % of a vinyl cyanide compound, 60 to 90 wt. % of an aromatic vinyl compound and 0 to 30 wt. % of another vinyl compound copolymerizable therewith.

Upon manufacturing a vehicular lamp under low-humidity circumstances such as winter by pressing a heated hot plate against a lamp body, thereby melting a portion of the lamp body and then adhering the melted portion to a lamp lens under pressure, thereby bonding the lamp body to the lamp lens, the use of a rubber-reinforced styrene resin obtained by adding thereto an antistatic agent according to the present invention makes it possible to largely reduce the stringiness of the resin which constitutes the lamp body, compared with the use of a rubber-reinforced styrene resin conventionally employed as a material for a lamp body. This method is particularly useful for the manufacture of vehicular lamps such as head lamp, winker and stop lamp.

DETAILED DESCRIPTION OF THE INVENTION

Figure 1:
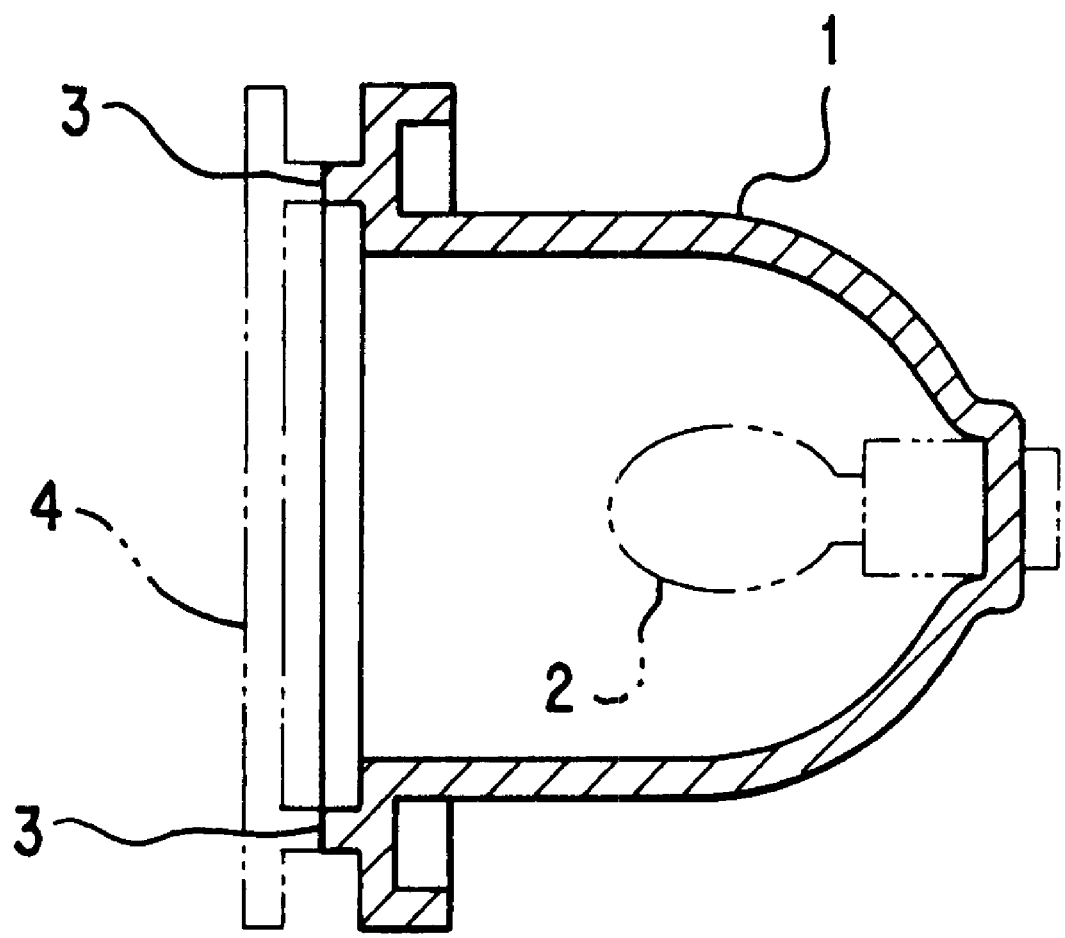
FIG. 1 is a cross-sectional view illustrating the product of a lamp body used for the evaluation of stringiness.

In the present invention, the incorporation of an antistatic agent in the resin composition to be used for the molding or forming of a lamp body has an important meaning. There is no particular limitation imposed on the nature of the antistatic agent insofar as it is ordinarily employed for an ABS resin. Examples include cationic surfactants such as alkylamine salts, anionic surfactants such as sulfate salts of a higher alcohol, sulfate ester salts of an ethylene oxide adduct of a higher alcohol, sulfate ester salts of an ethylene oxide adduct of an alkyl phenol, alkane sulfonates, alkylbenzene sulfonates, alkylsulfosuccinate ester salts, salts of a naphthalenesulfonic acid-formalin complex, phosphate ester salts of an ethylene oxide adduct of a higher alcohol and phosphate ester salts of an ethylene oxide adduct of an alkyl phenol; nonionic surfactants such as sorbitan esters of a higher fatty acid, monoglycerin esters of a higher fatty acid, ethylene oxide adducts of a monoglycerin ester of a higher fatty acid, ethylene oxide adducts of a higher alcohol, ethylene oxide adducts of a higher fatty acids, ethylene oxide adducts of an alkyl phenol, ethylene oxide adducts of an amide and ethylene oxide adducts of an alkylamine; polyalkylene glycols, polyalkylene glycol copolymers and polyether ester amides. They may be used either singly or in combination. Among them, alkane sulfonates, alkylbenzene sulfonates, polyalkylene glycols, polyalkylene glycol copolymers and polyether ester amides are preferred, with at least an antistatic agent selected from the group consisting of alkane sulfonates and alkylbenzene sulfonates being particularly preferred.

Although there is no particular limitation is imposed on the number of the carbon atoms of the alkane or alkyl of the above-mentioned alkane sulfonates or alkylbenzene sulfonates, the number of the carbon atoms ranging from 6 to 29, more preferably 8 to 18 is preferred. No particular limitation is imposed on the number of the sulfonic acid group per molecule, however, the number of the sulfonic acid group ranging from 1 to 3 is preferred. The number of the carbon atoms or sulfonic acid groups outside the above range tends to lower the impact resistance of the resulting product. Examples of the salt include sodium salt, potassium salt, lithium salt, calcium salt and magnesium salt, with the sodium salt and potassium salt being particularly preferred. They may be used either singly or in combination.

The antistatic agent is used in an amount of 0.1 to 5 parts by weight, preferably 0.5 to 4 parts by weight based on 100 parts by weight of the rubber-reinforced styrene resin. When the amount is less than 0.1 part by weight, effects for alleviating the stringiness under low-humidity conditions are not sufficient.

Examples of the rubber-reinforced styrene resin usable in the present invention include ABS resin, AAS resin and AES resin, of which the resin composition (C) composed mainly of 100 to 10 parts by weight of a graft copolymer (A) and 0 to 90 parts by weight of a vinyl copolymer (B), 100 parts in total, is preferred. As the graft copolymer (A), preferred is a graft copolymer obtained by reacting, upon graft polymerization of 80 to 5 parts by weight of a monomer mixture to 20 to 95 parts by weight of a rubbery polymer, 0.1 to 40 wt. % (more preferably 0.5 to 30 wt. %, particularly preferably 5 to 20 wt. %) of a glycidyl ester compound of an α,β-unsaturated acid as an essential component, 99.9 to 60 wt. % of at least one vinyl compound selected from the group consisting of vinyl cyanide compounds, aromatic vinyl compounds and alkyl (meth)acrylate compounds, more preferably 99.9 to 60 wt. % of a vinyl compound composed of 0 to 40 wt. % of a vinyl cyanide compound, 60 to 90 wt. % of an aromatic vinyl compound and 0 to 30 wt. % of an alkyl (meth)acrylate compound; and 0 to 30 wt. % of another vinyl compound copolymerizable therewith. As the above-mentioned vinyl copolymer (B), preferred is a vinyl copolymer available by reacting 10 to 40 wt. % of a vinyl cyanide compound, 60 to 90 wt. % of an aromatic vinyl compound and 0 to 30 wt. % of another vinyl compound copolymerizable therewith.

When the amount of the rubbery polymer in the graft copolymer (A) is less than 20 parts by weight, the impact resistance of the lamp body decreases. When the amount exceeds 95 parts by weight, on the other hand, the fluidity of the resin becomes markedly inferior. Amounts outside the above range are therefore not preferred. When the amount of the glycidyl ester compound of an α,β-unsaturated acid in the monomer mixture to be graft polymerized to the rubbery polymer is less than 0.1 wt. %, sufficient effects for reducing stringiness cannot be attained upon bonding the lamp body to a lamp lens by hot plate welding method. Amounts exceeding 40 wt. %, on the other hand, lower the fluidity of the resin upon molding or forming it into a lamp body and impact resistance of the lamp body thus obtained. Therefore, amounts outside the above range are not preferred.

No particular limitation is imposed on the rubbery polymer usable in the graft copolymer (A). Examples include diene rubbers such as polybutadiene rubber, styrene-butadiene rubber (SBR), acrylonitrile-butadiene rubber (NBR) and butyl acrylate-butadiene, acrylic rubbers such as butyl acrylate rubber, butadiene-butyl acrylate rubber, 2-ethylhexyl acrylate-butyl acrylate rubber, 2-ethylhexyl methacrylate-butyl acrylate rubber, stearyl acrylate-butyl acrylate rubber, dimethylsiloxane-butyl acrylate rubber and silicone series/butyl acrylate composite rubber, polyolefin rubber polymers such as ethylene-propylene rubber and ethylene-propylene-diene rubber and silicone rubber polymers such as dimethyl polysiloxane rubber. They may be used either singly or in combination.

The average particle size of the rubbery polymer is preferably 0.05 to 1 $\mu$m, with that of 0.07 to 0.4 $\mu$m being more preferred. As the rubbery polymer, that manufactured by the cohesion and enlargement method using an acid group-containing latex can also be used.

Examples of the glycidyl ester compound of an α,β-unsaturated acid to be graft polymerized to the above-mentioned rubbery polymer include glycidyl acrylate, glycidyl methacrylate and glycidyl ethacrylate. They may be used either singly or in combination. More specifically, glycidyl methacrylate is preferred as the glycidyl ester compound.

Examples of the vinyl cyanide compound used for the graft copolymer (A) or vinyl copolymer (B) include acrylonitrile and methacrylonitrile. Examples of the aromatic vinyl compound include styrene, α-methylstyrene, p-methylstyrene, p-isopropylstyrene, chlorostyrene and bromostyrene. Examples of the alkyl (meth)acrylate compound include methyl (meth)acrylate, ethyl (meth)acrylate and butyl (meth)acrylate. Examples of another copolymerizable vinyl compound therewith include acrylic acid, methacrylic acid, maleimide compounds such as N-phenylmaleimide, vinyl acetate and ethyl vinyl ether. They may be used either singly or in combination.

Each of the above-mentioned graft copolymer (A) and vinyl copolymer (B) is preferably obtained by emulsion polymerization, but that obtained by any polymerization process can be employed. Described specifically, if it is controlled to have a composition within the target range of the present invention, any polymerization process such as bulk polymerization, solution polymerization, suspension polymerization, emulsion-suspension polymerization and emulsion-bulk polymerization which are known to date can be employed. For example, the graft copolymer (A) may be obtained by polymerizing the above-mentioned monomer mixture in the presence of the rubbery polymer in an aqueous medium by using a radical initiator. The monomer mixture to be graft polymerized may be used as a mixture or in some portions as needed. No particular limitation is imposed on the adding method of the monomer mixture and it may be added in one portion or added successively.

As the radical initiator, known initiators such as thermal decomposition initiator such as potassium persulfate or redox initiator such as Fe-reducing agent-organic peroxide can be employed. In addition, a properly selected polymerization promoter, polymerization degree regulator and/or emulsifier can be used as needed. Polymerization temperature is preferably 30 to 90° C.

The mixing ratio of the graft copolymer (A) with the vinyl copolymer (B) in the resin composition constituting the lamp body of the present invention may be determined as needed with a view to obtaining desired physical properties.

The graft copolymer (A) is added in an amount of 100 to 10 parts by weight, preferably 60 to 10 parts by weight, while the vinyl copolymer (B) is added in an amount of 0 to 90 parts by weight, preferably 40 to 90 parts by weight. After the polymerization of the graft copolymer (A), it is also possible to polymerize the vinyl copolymer (B) in the same reactor.

The intrinsic viscosity of the resin composition (C) composed mainly of the graft copolymer (A) and the vinyl copolymer (B) preferably ranges from 0.25 to 1.5 (dl/g) (a N,N-dimethylformamide solution, 30° C.) in terms of a soluble matter in methyl ethyl ketone.

The resin composition may be obtained from the latices of the graft copolymer (A) and vinyl copolymer (B) in an ordinary manner. For example, it is obtained in the coagulated form by an inorganic salt such as calcium chloride, magnesium chloride or ammonium sulfate or an acid such as hydrochloric acid, sulfuric acid, phosphoric acid or acetic acid. Resin blending, on the other hand, can be carried out by an ordinarily employed method using a blender such as Henschel mixer or ribbon blender and upon blending, a desired stabilizer, antioxidant, ultraviolet absorber, lubricant, pigment, inorganic filler and/or glass fibers can be added as needed. In particular, the addition of a phenol, sulfur, phosphorus or hindered amine series stabilizer, an antioxidant, a benzophenone or benzotriazole series ultraviolet absorber, and a lubricant such as organopolysiloxane, ethylene-bis-stearamide, aliphatic hydrocarbon, ester of a higher fatty acid and a higher alcohol makes it possible to heighten the performance of the resin as a molding or forming resin. The above-exemplified stabilizers and lubricants may be used either singly or in combination.

As the resin composition (C) constituting the lamp body, a mixture of an ordinarily employed ABS resin, AS resin, polycarbonate resin, polyvinyl chloride resin, polyamide resin, PET resin or PBT resin with the above-mentioned graft copolymer (A) and the vinyl copolymer (B) can be used.

In the present invention, a vehicular lamp, such as that shown in FIG. 1, is manufactured by pressing a heated hot plate against a lamp body 1, housing a lamp bulb 2 and which has been molded or formed from a rubber-reinforced styrene resin such as resin composition (C), thereby melting a portion 3 of the lamp body 1, and pressing the melted portion 3 to a lamp lens 4 under pressure, thereby bonding the lamp body 1 to the lamp lens 4. Upon manufacturing, the hot plate is preferably heated to 250 to 500 C. As the lamp lens to be bonded to the lamp body, a lens made of a methyl methacrylate resin is preferred.

EXAMPLES

The present invention is now illustrated in greater detail with reference to Examples, but it should be understood that the present invention is not to be constructed as being limited thereto. All designations of "part" or "parts" and "%" will indicate part or parts by weight and wt. %, respectively, unless otherwise indicated.

(a) Preparation of the Graft Copolymer (A):

The below-described substances were charged in a reactor equipped with a stirrer, a reflux condenser, a nitrogen gas inlet, a monomer inlet and a thermometer.

Pure water 250 parts

Rubbery polymer kind and amount as shown in Table 1

Sodium formaldehyde sulfoxylate 0.3 part

Ferrous sulfate 0.0025 part

Disodium ethylenediaminetetraacetate 0.01 part

While stirring, the temperature was raised to 60° C. under a nitrogen gas stream. After the temperature reached 60° C., the monomer mixture as shown in Table 1 was added continuously dropwise for 5 hours. After completion of the addition, stirring was continued for further one hour at 60° C., whereby polymerization was completed.

TABLE 1

| | | Graft copolymer (A) | | | | |
| --- | --- | --- | --- | --- | --- | --- |
| | | A1 | A2 | A3 | A4 | A5 |
| Rubbery polymer | PBd [parts] | 70 | — | — | 70 | — |
| | SBR [parts] | — | 70 | — | — | — |
| | PBA [parts] | — | — | 70 | — | 70 |
| Monomer mixture | Amount [parts] | 30 | 30 | 30 | 30 | 30 |
| | GMA [%] | 10 | 15 | 15 | — | — |
| | AN [%] | 20 | 15 | 15 | 30 | 30 |
| | St [%] | 70 | 70 | 70 | 70 | 70 |
| CHP [parts] | | 0.3 | 0.3 | 0.3 | 0.3 | 0.3 |

PBd: polybutadiene, average particle size: 0.2 $\mu$m

SBR: (styrene/butadiene=25/75) copolymer average particle size: 0.1 $\mu$m

PBA: (butyl acrylate/allyl methacrylate=99/1) copolymer average particle size: 0.15 $\mu$m GMA: glycidyl methacrylate AN: acrylonitrile St: styrene CHP: cumene hydroperoxide (b) Preparation of the Vinyl Polymer (B):

The below-described substances were charged in a reactor equipped with a stirrer, a reflux condenser, a nitrogen gas inlet, a monomer inlet and a thermometer.

Pure water 250 parts

Sodium laurate 3 parts

Sodium formaldehyde sulfoxylate 0.4 part

Ferrous sulfate 0.0025 part

Disodium ethylenediaminetetraacetate 0.01 part

While stirring, the temperature was raised to 60° C. under a nitrogen gas stream. After the temperature reached 60° C., the monomer (I) as shown in Table 2 was charged. The resulting mixture was emulsified sufficiently, followed by the continuous dropwise addition of the monomer (II) as shown in Table 2 for 6 hours. After completion of the addition, stirring was continued for further one hour at 60° C., whereby polymerization was completed.

TABLE 2

| | | Vinyl copolymer (B) | | | |
| --- | --- | --- | --- | --- | --- |
| | | B1 | B2 | B3 | B4 |
| Monomer (I) | αMSt [%] | — | — | 75 | — |
| | tDM [parts] | — | — | 0.2 | — |
| Monomer (II) | AN [%] | 30 | 20 | 22 | 22 |
| | αMSt [%] | — | 50 | 3 | — |
| | MMA [%] | — | 10 | — | — |
| | PMI [%] | — | — | — | 15 |
| | St [%] | 70 | 20 | — | 63 |
| | CHP [parts] | 0.5 | 0.5 | 0.5 | 0.3 |
| | tDM [parts] | 0.3 | 0.3 | 0.2 | 0.4 |

αMST: α-methylstyrene
tDM: t-dodecyl mercaptan
MMA: methyl methacrylate
PMI: phenyl maleimide (c) Preparation of a Resin Composition (C) Constituting a Lamp Body for a Vehicular Lamp and Evaluation of Stringiness:

The graft copolymer (A) and the vinyl copolymer (B) which had been prepared above in (a) and (b), respectively, were mixed at a ratio (solid content) as shown in Table 3 each in the form of a latex. After the addition of an antioxidant to the resulting latex mixture, the mixture was solidified with calcium chloride, followed by heating, dehydration, washing with water and drying. To the resulting powder, a phenol series antioxidant ("AO-20", trade name; product of Asahi Denka Kogyo K.K., 0.3 part), a phosphorus series stabilizer ("PEP-24G", trade name; product of Asahi Denka Kogyo K.K., 0.3 part) and a lubricant EBS (ethylene-bis-stearamide, 1.0 part) were added. An antistatic agent (sodium tetradecanesulfonate or sodium dodecylbenzenesulfonate) was added at a ratio as shown in Table 3. The resulting mixture was extruded in an extruder (40 mmØ uniaxial extruder; product of Osaka Seiki Co., Ltd.) at 250° C., whereby pellets were obtained. By a 150 ton injection molder (manufactured by FANUC), the resulting pellets were formed into a No. 1 dumbbell specified in ASTM and a lamp body as shown in FIG. 1 at 250° C. The stringiness of them was evaluated and the results are shown in Table 3.

(d) Evaluation of Stringiness by Using the Dumbbell Test Piece:

Just after the formation by injection molding, the ASTM No. 1 dumbbell was allowed to stand under the following circumstances (1) or (2).

Conditions (1): The dumbbell was allowed to stand for 1 week in a thermostatic chamber adjusted to 23° C., and a relative humidity of 50% RH.

Conditions (2): The dumbbell was allowed to stand in a thermostatic chamber adjusted to 5° C. and a relative humidity of 15% in consideration of the low humidity in winter.

The resulting dumbbell test piece was pressed against an aluminum-made flat plate heated to 320° C. under a pressure of 10 kgf/cm² for 10 seconds. When it was pulled up at a velocity of 500 mm/min, the length [cm] of the string formed on the melted surface of the dumbbell was measured.

(e) Evaluation of Stringiness of the Lamp Body Product:

Just after the formation by injection molding, the lamp body product was allowed to stand under the following circumstances (1) or (2).

Conditions (1): The lamp body was allowed to stand for 1 week in a thermostatic chamber adjusted to 23° C. and a relative humidity of 50% RH.

Conditions (2): The lamp body was allowed to stand in a thermostatic chamber adjusted to 5° C. and a relative humidity of 15% in consideration of the low humidity in winter.

The lamp body product was pressed against an aluminum-made hot plate for 10 seconds at a welding temperature of 320° C. under a pressure of 10 kgf/cm² by using a hot plate welder. Whether the string was formed on the melted surface of the lamp body or not was judged when it was pulled up at a velocity of 50 mm/min.

TABLE 3

| | | Resin composition (C) | | | | | | | | | | | |
| | | Example | | | | | | | | | Comp. Ex. | | |
| | | C1 | C2 | C3 | C4 | C5 | C6 | C7 | C8 | C9 | C10 | C11 | C12 |
|---|---|---|---|---|---|---|---|---|---|---|---|---|---|
| Graft copolymer (A) | A1 | 30 | 30 | — | — | — | — | — | — | — | — | 30 | — |
| | A2 | — | — | 30 | — | — | — | — | — | — | — | — | — |
| | A3 | — | — | — | 30 | 30 | — | — | — | — | 30 | — | — |
| | A4 | — | — | — | — | — | 30 | 30 | 30 | — | — | — | — |
| | A5 | — | — | — | — | — | — | — | — | 30 | — | — | 30 |
| Copolymer (B) | B1 | 70 | 70 | — | 70 | 70 | 70 | 70 | — | — | 70 | 70 | 70 |
| | B2 | — | — | 70 | — | — | — | — | — | — | — | — | — |
| | B3 | — | — | — | — | — | — | — | — | 70 | — | — | — |
| | B4 | — | — | — | — | — | — | — | 70 | — | — | — | — |
| Antistatic agent | $C_{14}H_{29}SO_3Na$ | 1.0 | — | 1.0 | 1.0 | — | 1.0 | — | 1.0 | 1.0 | — | — | — |
| | $C_{12}H_{25}$—⟨C₆H₄⟩—$SO_3Na$ | — | 1.0 | — | — | 1.0 | — | 1.0 | — | — | — | — | — |
| Evaluation of stringiness using a dumbbell test piece [cm] | Conditions (1) | 0.0 | 0.0 | 0.0 | 0.0 | 0.0 | 0.0 | 0.0 | 0.0 | 0.0 | 2.8 | 0.1 | 2.3 |
| | Conditions (2) | 0.1 | 0.1 | 0.1 | 0.1 | 0.2 | 0.2 | 0.2 | 0.3 | 0.2 | 4.5 | 1.0 | 3.6 |
| Evaluation of stringiness using a lamp body product | Conditions (1) | A | A | A | A | A | A | A | A | A | C | A | C |
| | Conditions (2) | A | A | A | A | A | A | A | A | A | C | B | C |

Evaluation of stringiness using a lamp body product
A: No stringiness was observed.
B: Slight stringiness was observed.
C: Stringiness was observed.

As is apparent from the results of Table 3, stringiness of the lamp body manufactured by the hot plate welding method is largely alleviated, even after allowed to stand under low humidity circumstances, compared with a lamp body manufactured from the conventionally used ABS resin composition.

While the invention has been described in detail and with reference to specific examples thereof, it will be apparent to one skilled in the art that various changes and modification can be made therein without departing from the spirit and scope thereof.

What is claimed is:

1. A vehicular lamp, comprising:
a lamp body molded or formed from a rubber-reinforced styrene resin comprising 0.1 to 5 parts by weight of an antistatic agent based on 100 parts by weight of the rubber-reinforced styrene resin.

2. A vehicular lamp according to claim 1, wherein said antistatic agent is at least one compound selected from the group consisting of alkane sulfonates, alkylbenzene sulfonates, polyalkylene glycols, polyalkylene glycol copolymers and polyether ester amides.

3. A vehicular lamp according to claim 1, wherein said antistatic agent is at least one compound selected from the group consisting of alkane sulfonates and alkylbenzene sulfonates.

4. A vehicular lamp according to claim 1, wherein said rubber-reinforced styrene resin is a resin composition (C) composed mainly of 100 to 10 parts by weight of the following graft copolymer (A) and 0 to 90 parts by weight of the following vinyl copolymer (B), 100 parts by weight in total:
(A) a graft copolymer obtained by graft polymerization of 80 to 5 parts by weight of a monomer mixture to 20 to 95 parts by weight of a rubbery polymer, said monomer mixture containing 99.9 to 60 wt. % of at least one vinyl compound selected from the group consisting of vinyl cyanide compounds, aromatic vinyl compounds and alkyl (meth)acrylate compounds, 0 to 30 wt. % of another vinyl compound copolymerizable therewith and 0.1 to 40 wt. % of a glycidyl ester compound of an α,β-unsaturated acid; and
(B) a vinyl copolymer obtained by the reaction of 10 to 40 wt. % of a vinyl cyanide compound, 60 to 90 wt. % of an aromatic vinyl compound and 0 to 30 wt. % of another vinyl compound copolymerizable therewith.

5. A vehicular lamp according to claim 4, wherein the monomer mixture of said graft copolymer (A) comprises 99.9 to 60 wt. % of a vinyl compound composed of 0 to 40 wt. % of a vinyl cyanide compound, 60 to 90 wt. % of an aromatic vinyl compound and 0 to 30 wt. % of an alkyl (meth)acrylate compound; 0 to 30 wt. % of another vinyl compound copolymerizable with said vinyl compound; and 0.1 to 40 wt. % of a glycidyl ester compound of an α,β-unsaturated acid.

6. A vehicular lamp according to claim 4, wherein the content of the glycidyl ester compound in the monomer mixture of said graft copolymer (A) is 5 to 20 wt. %.

7. A vehicular lamp according to any one of claims 4 to 6, wherein said glycidyl ester compound is at least one compound selected from the group consisting of glycidyl acrylate, glycidyl methacrylate and glycidyl ethacrylate.

8. A vehicular lamp according to any one of claims 4 to 6, wherein said glycidyl ester compound is glycidyl methacrylate.

9. A vehicular lamp according to any one of claims 4 to 6, wherein said rubbery polymer has an average particle size of 0.05 to 1 µm.

10. A vehicular lamp according to any one of claims 4 to 6, wherein said rubbery polymer is at least one compound selected from the group consisting of polybutadiene rubber, styrene-butadiene rubber, acrylonitrile-butadiene rubber, butyl acrylate-butadiene rubber, butyl acrylate rubber, butadiene-butyl acrylate rubber, 2-ethylhexyl acrylate-butyl acrylate rubber, 2-ethylhexyl methacrylate-butyl acrylate rubber, stearyl acrylate-butyl acrylate rubber, dimethyl siloxane-butyl acrylate rubber, silicone series/butyl acrylate composite rubber, ethylene-propylene rubber, ethylene-propylene-diene rubber and dimethyl polysiloxane.

11. A vehicular lamp according to any one of claims 4 to 6, wherein said vinyl cyanide compound is at least one of acrylonitrile and methacrylonitrile.

12. A vehicular lamp according to any one of claims 4 to 6, wherein said aromatic vinyl compound is at least one compound selected from the group consisting of styrene, α-methylstyrene, p-methylstyrene, p-isopropylstyrene, chlorostyrene and bromostyrene.

13. A vehicular lamp according to any one of claims 4 to 6, wherein said alkyl (meth)acrylate compound is at least one compound selected from the group consisting of methyl (meth)acrylate, ethyl (meth)acrylate and butyl (meth)acrylate.

14. A vehicular lamp according to any one of claims 4 to 6, wherein said another vinyl compound copolymerizable therewith is at least one compound selected from the group consisting of acrylic acid, methacrylic acid, N-phenyl maleimide, vinyl acetate and ethyl vinyl ether.

15. A vehicular lamp obtained by pressing a heated hot plate against a lamp body as claimed in any one of claims 1 to 6, thereby melting a portion of the lamp body and adhering the melted portion to a lamp lens under pressure, thereby bonding the lamp body to the lamp lens.

16. A vehicular lamp according to claim 15, wherein a lens made of a methyl methacrylate resin is employed as said lamp lens.

17. A method for manufacturing a vehicular lamp, which comprises pressing a heated hot plate against a lamp body as claimed in any one of claims 1 to 6, thereby melting a portion of the lamp body, and adhering the melted portion to a lamp lens under pressure, thereby bonding the lamp body to the lamp lens.

18. A method for manufacturing a vehicular lamp according to claim 17, wherein the hot plate is heated to 250 to 500° C.

19. A method for manufacturing a vehicular lamp according to claim 17, wherein a lens made of a methyl methacrylate resin is employed as said lamp lens.

* * * * *